United States Patent [19]
Hollis

[11] Patent Number: 5,205,666
[45] Date of Patent: Apr. 27, 1993

[54] TRAILER COUPLER

[76] Inventor: Michael S. Hollis, 1326 East St., Minden, La. 71055

[21] Appl. No.: 942,792

[22] Filed: Sep. 10, 1992

[51] Int. Cl.$^5$ .............................................. F16D 1/00
[52] U.S. Cl. ..................................... 403/24; 403/141; 280/512
[58] Field of Search .............. 280/512; 403/141, 142, 403/143, 24, 13

[56] References Cited

U.S. PATENT DOCUMENTS

| | | | |
|---|---|---|---|
| 1,254,199 | 1/1918 | Brice | 403/143 X |
| 3,046,038 | 7/1962 | Hollis | 280/512 |
| 4,042,256 | 8/1977 | Lepp | 280/512 |
| 4,444,410 | 4/1984 | Martin | 280/512 |
| 4,657,276 | 4/1987 | Hameri | 280/512 |
| 4,817,979 | 4/1989 | Goettker | 280/512 |

*Primary Examiner*—Andrew V. Kundrat
*Attorney, Agent, or Firm*—Richard L. Miller

[57] ABSTRACT

An improved trailer coupler is provided for a trailer having a forwardly extending tongue, which consists of a housing fixed on and extending forwardly from the tongue. A pair of opposed jaws are pivoted on vertical axes on the housing. Each jaw has an inner side formed with a spherical concavity for embracing a hitch ball and a surface for forcing said improved trailer coupler to align with a said hitch ball. A jaw locking bail has a bight portion with a finger tab to facilitate operation of the bail and a pair of side portions, each with an ear extension. The side portions are horizontally pivoted on the housing at the ear extensions at opposite sides of the housing. The ball is swingable forwardly and downwardly from an elevated retracted position to a horizontal jaw-locking position, wherein the side portions completely engage the outer sides of the jaws and the bight portion completely engages the forward ends of the jaws in the closed positions of the jaws. A closure compression spring is located inwardly at one horizontally pivoted ear extension for biasing the bail towards the jaw-locking position.

4 Claims, 2 Drawing Sheets

TRAILER COUPLER

BACKGROUND OF THE INVENTION

The instant invention relates generally to ball and socket type couplings and more specifically it relates to an improved trailer coupler.

Numerous ball and socket type couplings have been provided in the prior art that are adapted to attach trailers to motor vehicles for towing purposes. For example, U.S. Pat. Nos. 3,046,038 to Hollis; 4,444,410 to Martin; 4,657,276 to Hamerl and 4,817,979 to Goettker all are illustrative of such prior art. While these units may be suitable for the particular purpose to which they address, they would not be as suitable for the purpose of the present invention as hereafter described.

SUMMARY OF THE INVENTION

A primary object of the present invention is to provide an improved trailer coupler that will overcome the shortcomings of the prior art devices.

Another object is to provide an improved trailer coupler that contains a mechanism which when closed will retain and lock a ball hitch thereto, so that the ball hitch will not accidently disengage therefrom.

An additional object is to provide an improved trailer coupler in which locking jaws of the mechanism can be quickly removed and replaced when worn.

A yet additional object is to provide an improved trailer coupler which force the coupler to automatically align with the hitch ball when a towing vehicle is backed up to a trailer with out requiring the same degree of alignment required by many prior art coupling devices.

A further object is to provide an improved trailer coupler that does not required that the coupler be raised higher than the hitch ball during a coupling procedure but simple allows the towing vehicle to be backed up to the trailer to cause a secure coupling condition.

A further additional object is to provide an improved trailer coupler that is simple and easy to use.

A still further object is to provide an improved trailer coupler that is economical in, cost to manufacture.

Further objects of the invention will appear as the proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
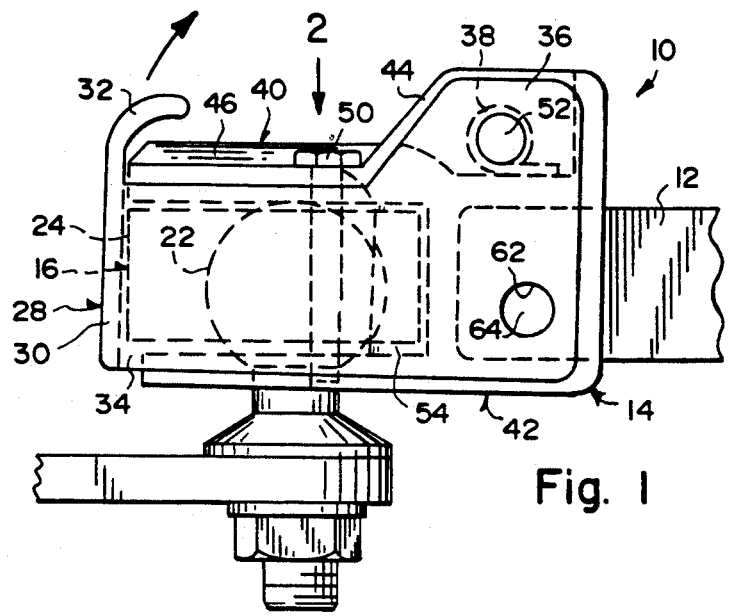
FIG. 1 is a side view of the instant invention with the locking bail in a locked position capturing a typical hitch ball.
Figure 2:
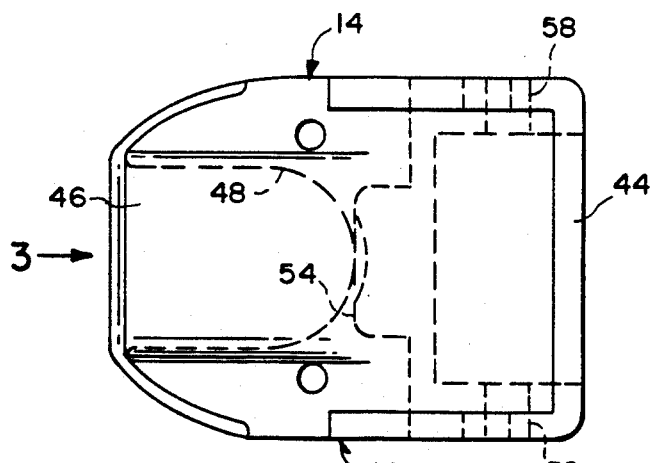
FIG. 2 is a view taken in the direction of arrow 2 in FIG. 1 of the coupling portion of just the instant invention per se.
Figure 3:
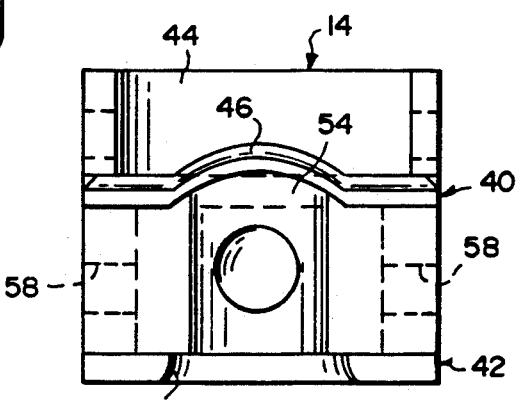
FIG. 3 is a view taken in the direction of arrow 3 in FIG. 2.
Figure 4:
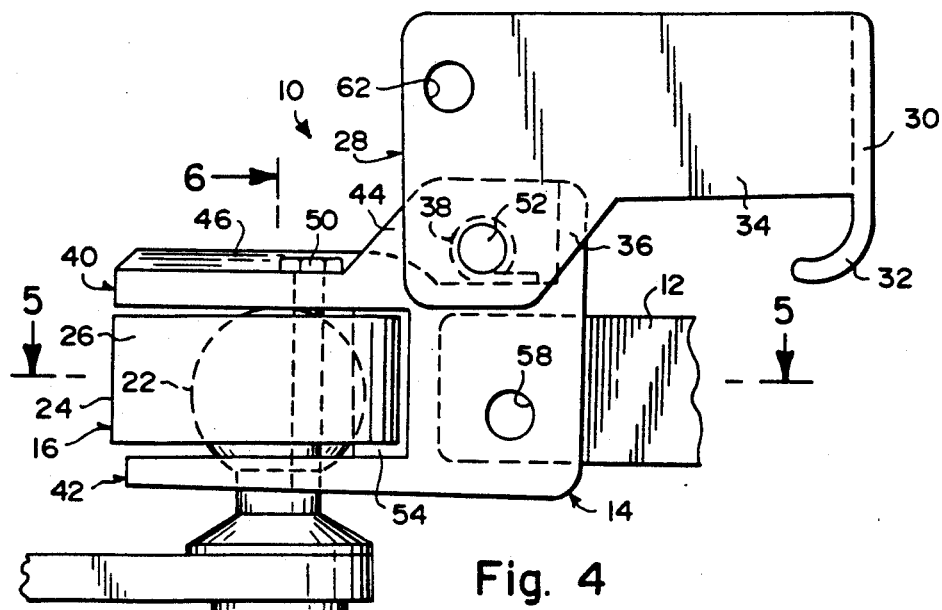
FIG. 4 is a side view similar to FIG. 1 of the instant invention but with the locking bail in an unlocked position.
Figure 5:
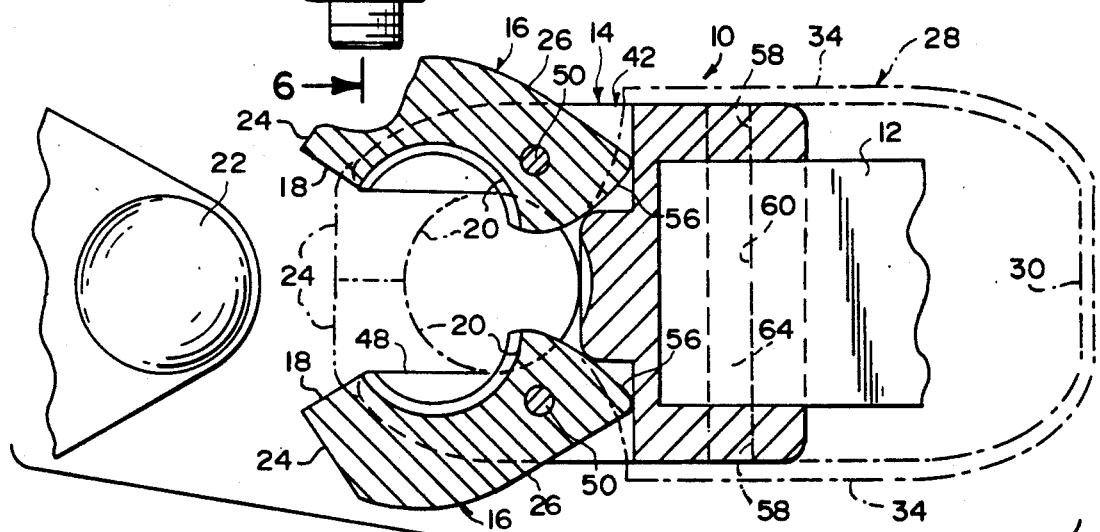
FIG. 5 is a cross sectional view taken on line 5—5 of FIG. 4 with the jaws open and the hitch ball removed therefrom.
Figure 6:
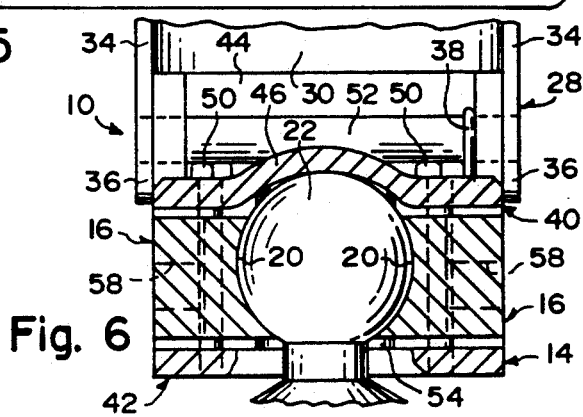
FIG. 6 is a cross sectional view taken on line 6—6 of FIG. 4 with the jaws closed about the hitch ball.

Turning now descriptively to the drawings, in which similar reference characters denote similar elements throughout the several views, the Figures illustrate an improved trailer coupler 10 for a trailer having a forwardly extending tongue 12, which consists of a housing 14 fixed on and extending forwardly from the tongue 12. A pair of opposed jaws 16 are pivoted on vertical axes on the housing 14. Each jaw 16 has an inner side 18 formed with a spherical concavity 20 for embracing a hitch ball, a forward end 24 and an outer side 26. A jaw locking bail 28 has a bight portion 30 with a finger tab 32 to facilitate operation of the bail 28, a pair of side portions 34 each with an ear extension 36. The side portions 34 are horizontally pivoted on the housing 14 at the ear extensions 36 at opposite sides of the housing 14. The bail 28 is swingable forwardly and downwardly from an elevated retracted position to a horizontal jaw-locking position, wherein the side portions 34 completely engage the outer sides 26 of the jaws 16 and the bight portion 30 completely engages the forward ends 24 of the jaws 16 in the closed positions of the jaws 16. A closure compression spring 38 is located inwardly at one horizontally pivoted ear extension 36 for biasing the bail 28 towards the jaw-locking position.

The housing 14 which can be fabricated typically out of steel and may be cast, dropped forged etc., is opensided and has horizontally parallel spaced top and bottom portions 40, 42 between which the jaws 16 are positioned. The top portion 40 has a rear fence segment 44 and a forward concave segment, while the bottom portion 42 has a central longitudinal slot 48 extending rearwardly. A pair of high strength bolts 50 are each engaged in and extends between the top and bottom portions 40, 42 of the housing 14 on which the jaws 16 are pivoted. A pivot pin 52 extends through the ear extensions 36 of the bail 28 and the fence segment 44 of the top portion 40 of the housing 14. The side portions 34 of the bail 28 can pivot about the fence segment 44 of the top portion 40 of the housing 14.

A jaw opening stop 54 is formed in the housing 14 between the top and bottom portions 40, 42 at a location centered with respect to and behind the jaws 16. Each jaw 16 has a stop surface 56 located on a rearward end. The stop surfaces 56 have a stop engagement with the jaw opening stop 54 in the fully open position of the jaws 16. When the hitch ball 22 enters under the concave segment 46 of the top portion 40 and the slot 48 in the bottom portion 42, it will contact the concavity 20 causing the jaws 16 to go into a fully closed position.

The housing 14 has a pair of horizontal apertures 58 located at a lower rear corner thereof, which align with an aperture 60 through the tongue 12 of the trailer. The bail 28 has a pair of apertures 62, each located at a lower rear corner of each side portion 34. When the bail 28 is in the horizontal jaw-locking position the apertures 62 in the bail 28 will align with the horizontal apertures 58 in the housing 14. A locking element typically a pin 64, a bolt or cotter key not illustrated can be manually placed through the apertures 62 in the bail 28 and the horizontal apertures 58 in the housing 14 to retain the bail 28 in the horizontal jaw-locking position.

In operational use when backing a tow vehicle up to a trailer even if the hitch ball 22 is not well aligned with the improved trailer coupler 10 the jaws 16 will force the coupler 10 to automatically align with the hitch ball 22 as along as the driver of the towing vehicle manages to cause the hitch ball 22 to strike the improved trailer coupler 10 on an inner side 18 of one of the jaws 16. Further backing up of the vehicle then causes the jaws 16 to close about the hitch ball 22 so that the bail 28 need only released and allowed to close over the housing 14 and jaws 16 to insure a secure coupling condition between the towing vehicle and trailer.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved trailer coupler for a trailer having a forwardly extending tongue, which comprises:
   a) a housing for fixing on and extending forwardly from the tongue;
   b) a pair of opposed jaws pivoted on vertical axes on said housing, each said jaw having a forward end, an outer side and an inner side formed with a concavity for embracing a hitch ball;
   c) each said jaw having a surface for forcing said improved trailer coupler to align with a said hitch ball;
   d) a jaw locking bail having a bight portion with a finger tab to facilitate operation of said bail and a pair of side portions each with an ear extension, the side portions being horizontally pivoted on said housing at the ear extensions at opposite sides of said housing, said bail being swingable forwardly and downwardly from an elevated retracted position to a horizontal jaw-locking position, wherein the side portions completely engage the outer sides of said jaws and the bight portion completely engages the forward ends of said jaws in the closed positions of said jaws; and
   e) a closure compression spring located inwardly at one horizontally pivoted ear extension for biasing said bail towards the jaw-locking position.

2. An improved trailer coupler as recited in claim 1, further including:
   a) said housing fabricated out of steel casting being open-sided and having horizontally parallel spaced top and bottom portions between which said jaws are positioned, the to portion having a rear fence segment and a forward concave segment and the bottom portion having a central longitudinal slot extending rearwardly;
   b) a pair of high strength bolts, each engaged in and extending between the top and bottom portions of said housing on which said jaws are pivoted; and
   c) a pivot pin extending through the ear extensions of said bail and the fence segment of the top portion of said housing, so that the side portions of said bail can pivot about the fence segment of the top portion of said housing.

3. An improved trailer coupler as recited in claim 2, further including:
   a) a jaw opening stop formed in said housing between the top and bottom portions at a location centered with respect to and behind said jaws; and
   b) each said jaw having a stop surface located on a rearward end, the stop surfaces having a stop engagement with said jaw opening stop in the fully open position of said jaws, so that when hitch ball enters under the concave segment of the top portion and the slot in the bottom portion, it will contact the concavity, causing said jaws to go into a fully closed position.

4. An improved trailer coupler as recited in claim 3, further including:
   a) said housing having a pair of horizontal apertures located at a lower rear corner thereof which align with an aperture through the tongue of the trailer;
   b) said bail having a pair of apertures, each located at a lower rear corner of each side portion, so that when said bail is in the horizontal jaw-locking position the apertures in said bail will align with the horizontal apertures in said housing, whereby a locking element may be manually placed through the apertures in said bail and the horizontal apertures in said housing to retain said bail in the horizontal jaw-locking position.

* * * * *